United States Patent [19]

Van Liere

[11] Patent Number: 4,810,513

[45] Date of Patent: Mar. 7, 1989

[54] PROCESS FOR TREATING RAW SOYBEANS

[76] Inventor: Merle Van Liere, R.R. 2, Colton, S. Dak. 57018

[21] Appl. No.: 925,650

[22] Filed: Oct. 30, 1986

[51] Int. Cl.$^4$ .......................... A23L 1/20; A23K 1/14
[52] U.S. Cl. ................................ 426/465; 426/511; 426/507; 426/457; 426/461
[58] Field of Search ............... 426/630, 634, 465, 511, 426/457, 461, 507, 807

[56] References Cited

U.S. PATENT DOCUMENTS

| | | |
|---|---|---|
| Re. 10,978 | 1/1889 | Cormack . |
| 430,290 | 6/1890 | Hudnot . |
| 1,424,927 | 8/1922 | Luft . |
| 2,928,738 | 3/1960 | Kruse .................... 426/630 |
| 3,764,708 | 10/1973 | Aonuma et al. ............ 426/511 |
| 3,782,968 | 1/1974 | Herzberg et al. .......... 426/511 |
| 4,137,339 | 1/1979 | Kudo et al. ............. 426/634 |
| 4,209,541 | 6/1980 | Clatfelter et al. ........ 426/430 |
| 4,359,480 | 11/1982 | Kock .................... 426/511 |

FOREIGN PATENT DOCUMENTS 0042545 12/1981 European Pat. Off. ............ 426/630

OTHER PUBLICATIONS

Smith et al., Soybeans; Chemistry & Technology, vol. 1, p. 88, 1972.

Primary Examiner—Peter Kratz
Attorney, Agent, or Firm—Caesar, Rivise, Bernstein, Cohen & Pokotilow, Ltd.

[57] ABSTRACT

A process for producing a full-fat flaked soybean product having 18% soybean fat and a urease activity of 0.02–0.1 is provided. Raw soybeans with hulls in tact are subjected to steaming at temperatures greater than 220° F., followed by flaking in a roller mill having grooved rollers. The flaked soybeans are thereafter dried in a forced air dryer by the alternating application of superheated air at temperatures in excess of 300° F. and cooled to ambient temperature.

14 Claims, 1 Drawing Sheet

PROCESS FOR TREATING RAW SOYBEANS

FIELD OF THE INVENTION

The present invention relates to a process for treating raw hulled soybeans, and in particular, the invention relates to a process for heat treating raw hulled soybeans which breaks down proteolytic inhibiting substances therein to enable proper utilization of the protein in the soybeans while maintaining high fat levels in the soybeans with no protein damage.

BACKGROUND OF THE INVENTION

Soybeans are considered one of the optimum sources for supplemental protein fed to livestock today. Raw soybeans, however, cannot be fed to livestock and consequently, raw soybeans must be treated in order to make them suitable feed supplements. The reason soybeans cannot be fed in the raw state is because proteolytic inhibiting substances are present in the raw soybeans. The presence of these inhibiting substances requires that the raw soybeans be cooked or heated in order to destroy the harmful urease enzymes and trypsin inhibitors. These substances in the raw soybeans have a retarding effect upon the growth of livestock and they can actually prevent proper utilization of the protein supplementation provided by the soybean feed material. Care must be taken in the heating process, however, because even though the heating is required to destroy the trypsin inhibitors, improper cooking will result in damage to the protein product itself.

In order to achieve a soybean feed product which is free of the inhibiting substances, most soybeans are now processed by a solvent-extraction method to produce what is commonly known as soybean meal. The solvent-extraction method, however, removes nearly all of the oil in the soybean so that the resultant soybean meal contains only about 0.5% of the original oil in the raw soybean.

In recent years, studies have been conducted to determine the caloric energy in oil or fat used to enhance livestock feed products. It has been proven that adding fat or oil to livestock feeding rations greatly enhances the efficiency of the feed. The drawback, however, is that actually adding animal or vegetable fat to the livestock diet is inconvenient and not always cost effective. One of the most convenient and economical ways of getting this added fat into the livestock diet is to provide soybeans which still contain the full oil or full-fat content of the bean. Each ton of full-fat soybeans contains approximately 360 pounds of oil.

As noted earlier, raw soybean cannot be fed to livestock because it contains inhibiting substances which have a retarding effect on the development and growth of monogastric animals. These undesirable proteolytic inhibitors, such as lipozidases and perioxidases, must be deactivated and removed from the soybean. Various processing methods have been developed for this removal of the inhibitors. These methods for processing differ considerably in their ability to provide full-fat soybean products, but all of the methods are consistent in the requirement of using heat to treat the raw soybean material.

One such method may be conveniently termed the "extrusion" method. In the extrusion method, full-fat soybean meal is prepared by an extrusion process in which heat and pressure are developed by passing the soybean by means of a screw extruder through the increasingly restricted extruder barrel. This confined movement of the soybean material causes heating of the soybean by attrition and pressure. The resulting product is discharged into the atmosphere where the sudden decrease in pressure results in expansion of the soybean material. Heating through the extruder acts to detoxify any anti-nutritive inhibiting substances. The expansion causes the oil cells within the soybean to rupture, and as the soybean product cools the oil is absorbed into the cells of the soybean. The processing temperature varies depending upon the moisture content of the soybean, as well as the maturity of the soybean. During the extrusion process, moisture is removed in the form of steam from the full-fat soybean and some of the undesirable urease activity properties are contained within the steam which is removed.

The extrusion method requires a substantial input of energy to operate the extrusion machinery, and the finished full-fat soybean product is not always consistent in urease activity, or protein or fat level since the processing temperatures vary depending on the moisture content and maturity of the starting raw soybeans. Furthermore, considerable expertise is involved in ensuring that the extrusion machinery runs properly, and there is a large soybean volume loss due to shrinkage of the soybeans. Since the oil cells are ruptured, the finished full-fat product is greasy and oily and, accordingly, the finished product is difficult to handle. The finished product does not flow freely through augers or other moving devices and because of the oil content, the shelf life is often reduced due to rancidity problems. This rancidity also causes the resultant soybean feed material to be less palatable to livestock.

A similar type of full-fat preparation process might be known as a modified extrusion soybean process. This technique also uses the concept of keeping the oil inside the finished soybean product. Raw soybeans are ground and subjected to a sulfite treatment and pH adjustment. Moisture content is standardized to 15% and the soybeans are extruded at 300° F. This process results in thermal acceleration allowing greater production through the extruder while destruction of the proteolytic inhibitors takes place. This process, however, still has the drawbacks found in the previous extrusion process.

Another method for processing raw soybeans into a full-fat soybean protein source is the infrared roasting method, but there are great drawbacks to the use of infrared roasting on a commercial level. Due to the size of the equipment and the small quantity of raw soybeans that can be processed in a minimal length of time, infrared roasters are not normally used in commercial processing. The infrared process is more likely to be used by the individual feeder in a bulk or batch processing application directly at the feeding location.

In the infrared process, full-fat soybeans are prepared in an infrared roaster where the soybeans are heated by means of infrared roasting to deactivate the urease enzyme. When the soybeans are roasted there is considerable shrinkage and weight loss as a result of the decreased moisture content. The loss of moisture concentrates the nutrients to a certain degree, but if excessive heat is applied during the infrared processing, the feeding value may be greatly decreased because the protein content is undesirably affected by the excessive heat and some of the amino acids may become unavailable. In addition, further heat processing and/or physical processing may be necessary to achieve the maximum utilization of the energy of the fat in the roasted soybean. As found in the previously discussed methods, inconsistent protein values generated by the process make it difficult to maintain the feed ration values and insufficient urease activity removal retards growth efficiency in the livestock who are fed the infrared roasted soybeans.

By far, the most widely used method for treating soybeans is the solvent-extraction method which utilizes chemical extraction of the various inhibiting materials. The solvent-extraction process for processing soybean meal is totally different in concept than the previously discussed full-fat soybean treatment processes. The solvent-extraction method, however, does not have as its goal the preparation of a full-fat soybean product. In the solvent-extraction method, all but about 0.5% of the oil is removed. This leaves the remaining soybean meal with approximately 43% to 50% protein, approximately 1,350 kilocalories of metabolizable energy per pound and 2.7 to 3.5% lysine. The characteristics of the solvent-extraction method should be compared with the full-fat soybean which utilizes the whole soybean and contains approximately 38% protein, 1,650 kilocalories of metabolizable energy per pound and 2.4% lysine. The significant increases in these growth producing materials show the increased desirability of using full-fat soybean products.

These prior art methods, while having the common goal of obtaining a full-fat soybean livestock feed product, have common drawbacks and problems. Of primary concern is overcooking or undercooking of the soybean. It is difficult to regulate the quality of the feed product when it is difficult to regulate the cooking of the soybean. Consequently, one of the major problems is consistency of the product.

While it is known that heat processing and/or physical processing is necessary to obtain the maximum utilization of the energy-fat in the soybean, if excessive heat is applied during the processing, the feeding value may be low because some of the amino acids will become unavailable for use in the feed product. If raw soybean is taken through any of these treating processes and left undercooked, that is, not enough heat is applied, urease activity will be high and the the trypsin inhibitors will not be destroyed.

When soybeans are treated in either the extrusion or roasting process, there is also considerable shrinkage or weight loss due to the loss of moisture. This can be a problem since the feed buyer normally pays for the weight loss and weight loss increases the price of the finished product. For example, if 1,000 pounds of soybeans are processed and there is a 5% weight loss due to moisture loss, only 950 pounds of processed soybeans will be obtained.

An additional problem which is common to the extruded soybean product is spoilage in the finished full-fat product. The oil cells of the soybean are ruptured during processing so that the end product is "greasy" and oil-filled. This release of oil has a tendency to increase rancidity and spoilage. The shelf life of the full-fat extruded soybean is also decreased because of the ruptured oil cells.

These products also have a tendency to bridge so that flowability of the finished product is a definite problem. Energy consumption is another consideration with these prior processes, since it requires a considerable amount of energy to run extruders and roasters. Also required are experienced laborers who must be well trained to adapt and modify the equipment according to moisture levels in the raw soybeans. Finally, the consistency of the urease activity (the measure by which the elimination of the trypsin in integers is measured) is not good in the prior methods.

OBJECTS OF THE INVENTION

With the above background in mind, it is a primary object of the present invention to provide a unique process for removing undesirable, growth retarding and dangerous inhibiting substances from raw, hulled (with hulls in tact) soybeans while retaining all of the soybean oils in the finished livestock feed product. In keeping with this objective, the present invention removes the toxic urease enzyme and trypsin inhibitors while retaining energy-filled oils, but without the protein heat damage associated with prior methods. It is another object of the present invention to consistently maintain fat levels of 17–18% in the finished full-fat soybean product produced by the method of this invention.

It is a further object of the invention to produce a full-fat flaked soybean product, which flaked product obviates problems of rancidity by sealing the soybean oils within the flaked soybean. The soybean flake improves handling properties and flows more freely through mechanical moving devices because the surface of the flake is non-oily and dry.

A still further object of the present invention is to produce a full-fat flaked soybean feed product that maintains its size, shape and density and which has improved flavor and palatability.

Yet another object of the present invention is to produce a full-fat flaked soybean feed product that does not contain as much dust as previous processes.

Another object of the present invention is to produce a full-fat flaked soybean product which may be fed by the consumer in flaked form, ground form or in pelleted form.

A further object of the present invention is to produce a full-fat flaked soybean product wherein quality, moisture content and/or maturity of the raw soybeans with the hulls in tact does not substantially affect the consistency of the finished, processed product.

Yet another object of the present invention is to produce a full-fat flaked soybean product with hulls in tact without excessive shrinkage due to reduced weight loss from moisture reduction.

A still further object of the present invention is to produce a full-fat flaked soybean product which mixes well with other grains and feedstuffs in livestock feeding operations in order to minimize the segregation or separation of the soybean product from the total feed combination.

SUMMARY OF THE INVENTION

In furtherance of these objectives, a process for producing a full-fat flaked soybean product is provided. Raw soybeans with their hull in tact, i.e. the outer covering of the soybean has not been removed, are passed through a steam chamber where live steam is injected at a temperature of 220° F. for approximately 20–25 minutes. This step reduces the enyzeme inhibiting systems approximately 50%. The soybeans are removed from the steam chamber and pressed between grooved rollers in a rolling mill to produce a crimped flat flake having a thickness of approximately 1/16th of an inch. The flaking process does not remove the hull from the soybean. The flaked soybean material is then subjected to a second heat treatment wherein the soybean flakes are superheated to temperatures in excess of 300° F. in alternating burn cycles for a period of 12–15 minutes. The superheated air is forced into the flaked soybean in cycles of eight seconds on with intense heat, followed by four seconds off. After the heating sequence is completed, the flakes are allowed to cool within the dryer to ambient temperature. Thereafter, the treated flakes are removed from the dryer and are ready for packaging.

The cooling of the flakes enhances the handling and flowability of the soybean product, and agitation is provided in the dryer to increase the flowability of the treated soybeans therefrom.

The process of the invention deactivates and removes urease activities to the objective goal of 0.02 to 0.1.

DESCRIPTION OF THE DRAWINGS

Other objects and many of the attendant advantages of the instant invention will be readily appreciated as the same become understood by reference to the following detailed description when considered in conjunction with the accompanying drawing, wherein.

DETAILED DESCRIPTION OF THE PREFERRED EMBODIMENT

Figure 1:
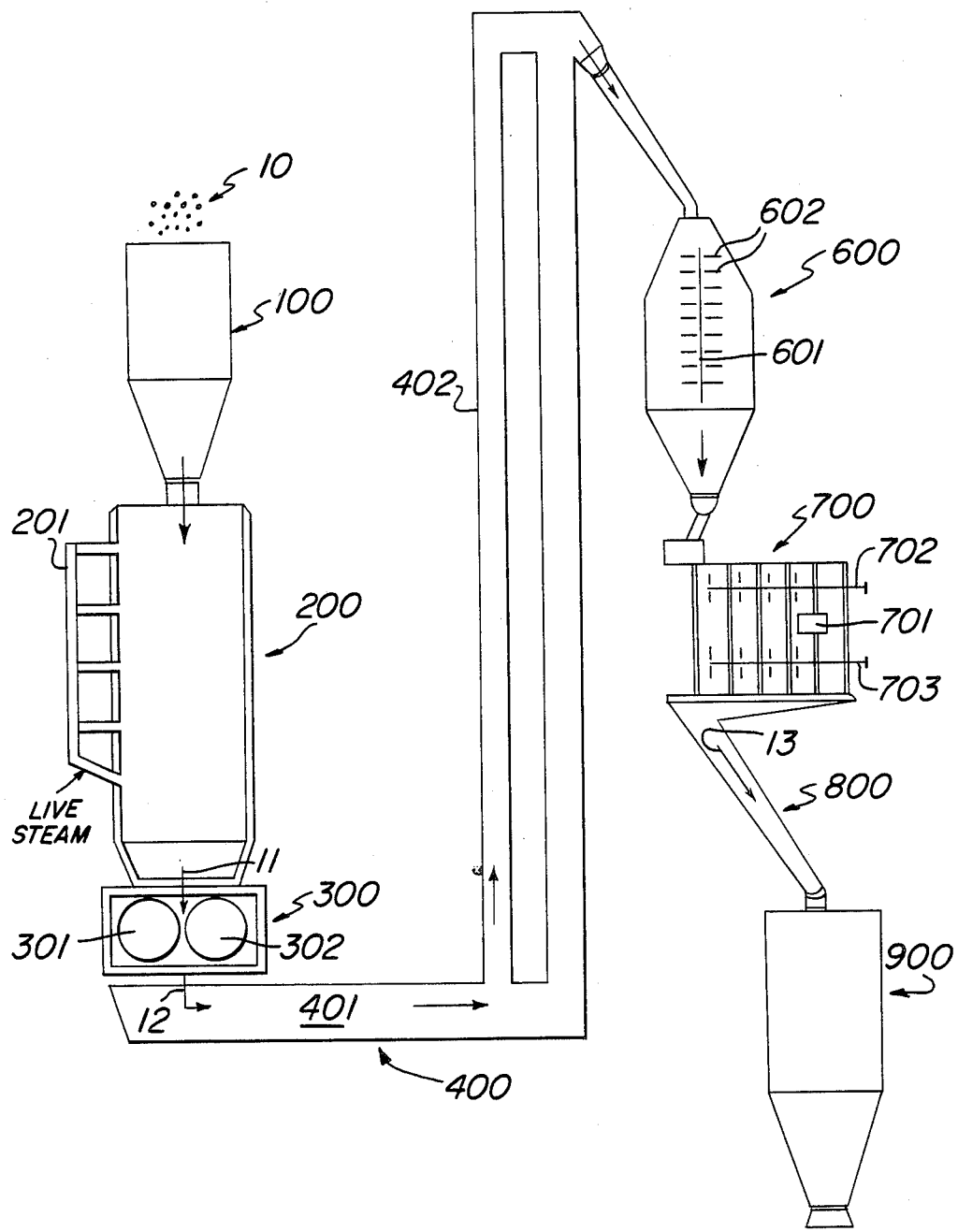
FIG. 1 is a schematic drawing of the process of the present invention.

Referring now in greater detail to FIG. 1, the soybean treatment process of the present invention is generally shown. In the preferred embodiment of the process, raw soybeans 10 with their hulls in tact, i.e., the outer covering of the soybean has not been removed, are stored in a first holding bin 100 before being transferred to a steam chamber 200. From the steam chamber 200, steamed hulled soybeans 11 pass through a roller mill 300 which flakes the soybeans. The flaked soybeans 12 are carried by a conveyer 400 to a second holding tank 600 where the flaked soybeans are held until they are transferred into a dryer system 700. After heat treatment and cooling in the dryer system 700, the flaked beans 13 are removed from the dryer and transferred by an anger 800 to a third holding tank 900.

The process of preparing the full-fat flaked soybean of the present invention begins with the natural raw, hulled soybeans 10 which are held within the holding bin 100. These raw soybeans 10 are transferred into the steam chamber 200. Live steam 201 is injected into the steam chamber 200 at a temperature of 220° F. for approximately 20–25 minutes. This steam/heat treatment of the raw soybeans 10 removes approximately 50% of the inhibiting enzyme systems present in the raw, hulled soybean. At this point, the urease activity remains two to three times higher than the recommended safe levels for monogastric animals. As discussed previously, removal of the proteolytic substances present in the raw soybeans is necessary to convert the soybeans into livestock feed. Whether the inhibiting substances found in the raw soybeans are referred to as urease activity, trypsin inhibitors, acidity, toxic enzymes, lipozidases or perioxidases, it is commonly understood in the soybean and livestock feed industry that animals being fed soybean products or soybean meal are intolerable to the substances which can have a retarding growth effect on them. This first heat treatment with the live steam 201 in the steam chamber 200 begins the process of removing these toxic enzyme systems. In addition, the steam treatment softens the soybean with the hull in tact and prepares it for passage through the roller mill 300.

The first holding bin 100 is any readily available storage bin which is suitable for storing the raw soybeans. In the preferred embodiment of the steam chamber 200, a 4"×20" stainless steel container manufactured by Roskamp Manufacturing is used. This container is assembled with steam inlets in place and needs only to be connected to a steam boiler.

The second processing step of the invention consists of removing the steamed soybeans 11 from the steam chamber 200 after the treatment with the live steam and immediately passing the soybeans 11 between grooved rollers 301, 302 in the roller mill 300. The grooved rollers 301, 302 produce a crimped, flat surface soybean flake 12. The rollers 301, 302 are positioned so that the soybean flake 12 has an approximate thickness of 1/16 of an inch.

Because the raw soybeans 10 have been steamed in the steam chamber, the compressing action of the grooved rollers 301, 302 does not dehull the soybeans and the entire soybean stays in tact. The crimping or rolling of the steamed soybean 11 is a very important step in the procedure. By uniformly flattening the steamed soybeans 11 which have an original circular, ball-like natural shape and a diameter of approximately ⅜ of an inch, the surface area of the cellular structure is increased, thereby enabling the greatest possible exposure of each individual soybean to the application of heat. Accordingly, by crimping or rolling the soybean into the 1/16" thickness "flake", more even heat distribution is attained in the subsequent heating step.

In the preferred embodiment, when the steamed soybeans 11 exit the steam chamber, they immediately pass through the roller mill 300 which is positioned at the exit of the steam chamber. Removal from the steam chamber is a result of the downward flow of the soybeans 11 caused by gravity and the circular motion of the grooved rollers 301, 302 in the roller mill 300. The roller mill 300 used is commercially available from Roskamp Manufacturing.

By controlling the gate opening into the roller mill, the flow of raw soybeans 10 through the steam chamber 200 can be controlled so that the beans are in the steam chamber for approximately 20–25 minutes. This is the time it should take for the beans to travel from the top to the bottom of the steam chamber 200.

The flattened or crimped soybean flakes 12 fall from the roller mill onto a conveyer system 400 which transports the crimped flakes 12 to a second holding tank 600. Because the roller mill 300 and the second holding tank 600 are on different levels, the conveyor system 400 consists of a belt-type conveyor 401 and a cup conveyor 402 which lifts the steamed flaked soybeans 12 to the holding tank 600. These conveyors are available from California Pellet.

The flakes 12 are held in the tank 600 until they can be passed into the dryer 700. The holding tank 600 is preferably provided with an agitator 601 to prohibit the flakes from sticking together. The agitator 601 is used to agitate and stir the soybeans only during the time the soybeans are being transfered from the second holding tank 600 to the dryer 700.

In the preferred embodiment, the holding tank 600, which is conically shaped to facilitate the downward flow of the flakes is modified by including a motor driven staft 601 vertically through the bin. The shaft 601 as fins 602 which agitate the flakes in the tank when the shaft is rotated. Because the agitation is only to facilitate removal of the flakes from the tank, a slow rotation of approximately twenty-five revolutions per minute is necessary.

From the holding tank 600 the flaked soybeans 12 pass into the dryer 700 where the soybeans undergo a second heat treatment to further remove undesirable toxic enzyme systems or inhibitors therefrom. In the dryer 700, the flat, crimped soybean flakes 12 with the hulls in tact are superheated in timed temperature sequences to temperatures in excess of 300° F. in alternating cycles for 12 to 15 minutes.

The dryer 700 is, in the preferred embodiment, a grain dryer which has been adapted to provide superheated forced air to the soybeans. The optimum heating performance is obtained when uniform heat is applied in a burn cycle of eight seconds followed by an off-sequence cycle of four seconds. This burn-rest cycle is repeated for at least 12 minutes and no longer than 15 minutes, depending on moisture content of the beans and the outside temperature.

The dryer 700 of the preferred embodiment is a standard grain dryer manufactured by American Dryer which has been adapted to the requirements of this process. In particular, the gas metering valves were changed to enable the dryer to reach temperatures in excess of 300° F. The dryer's standard temperature was set at 220° F. Also, the controls for the burn cycles were adapted from the standard twelve seconds on, five to six seconds off to the required eight seconds on, four seconds off of the process of this invention.

After the cycled heating within the dryer 700, the flakes 12 are allowed to cool to atmospheric temperature (generally ten to fifteen minutes) before being removed from the dryer. This cooling step greatly enhances the flowability of the flaked particles and makes removal of the full-fat flaked soybean product from the dryer easier.

The dryer 700 discussed previously has a standard model vibrator 701 affixed thereto for vibrating the dryer to prevent the flaked beans thereinside from adhering together, and furthermore, the dryer has agitators therein to keep the soybean flakes in motion during removal of the cooled flakes from the dryer 700. In this way complete emptying of the dryer is ensured. Any flakes which remain will be adversely affected by further heating during subsequent heating of flakes in the dry 700, and may even burn.

The dryer 700 (as previously described) was further modified by the addition of four rotating agitator rods running lengthwise therethrough. Two parallel, spaced agitator rods 702 extend through the upper portion of the dryer, these two agitator rods being rotated by V-belts connected to a motor. Two additional rotatable, parallel agitator rods 703 are position in the lower portion of the dryer beneath the space between the upper two parallel rods. These lower rods 703 are rotated by a chain drive.

After cooling, the bottom of the dryer 700 is opened and the cooled flakes 13 are emptied into an auger 800 therebeneath which transfers the treated soybean flakes to a holding tank 900. During the emptying sequence, the agitating rods 702, 703 are rotated and the vibrator 701 is turned on. From the holding tank 900, the soybean flakes are ready for pabkaging or other distribution.

The entire soybean treatment process, based on approximately two and a half to three and a half tons per hour through the steam chamber 200, should be completed in approximately one hour: 20-25 minutes in the steam chamber 200; milling, transfer and holding time; 12-15 heating time in the dryer 700; 10-15 cool down in the dryer; and removal from the dryer 700. While the heating in the dryer 700 is a batch operation, the best results are obtained by processing the raw soybeans 10 from start to finish with as little holding time between flaking in the roller mill 300 and drying. It has proven best not to hold the flaked soybeans 12 for extended periods of time in the holding tank 600 as bridging problems begin to occur.

The soybean flake 13 removed from the dryer 700 is a full-fat flaked soybean. The fat level within the soybean flakes 13 is consistently maintained at approximately 18% and the urease activity is consistently between 0.02 and 0.2. The optimum recognized urease activity range is between 0.05-0.2. With the lower end of the recognized range (0.05) being most favorable, it is clear that the present process produces full-fat soybeans well within this range, i.e. 0.02 to 0.1, and even better than the recognized lower limit, (0.05). Furthermore, while it is very difficult to measure the level of trypsin inhibitors, it is known that as urease activity decreases, so do the trypsin levels. Thus, the full-fat soybean flakes produced by the process are with the recognized optimum range for trypsin levels as well.

The physical appearance of the full-fat soybeans prepared by the present invention is distinctly different from previous methods. The full-fat flaked soybeans of the present invention are more readily handled because of the improved nature of the oil retention sealed within the flakes themselves. There is no oil coating the surface of the flake so the soybean flake is less likely to become rancid and has increased longevity or shelf life in comparison to the full-fat soybean products produced by prior processes. In addition, the full-fat flaked soybeans of the present invention have less dust in the product and the flavor and palatability of the flaked soybeans is appealing to livestock, thereby eliminating consumption problems. An additional benefit of the full-fat flaked soybean produced by the method of the present invention is also the versatility for use of the product because of its physical form. The full-fat product can be fed to livestock as a high-energy protein feed source in its flaked form or the product can be ground into meal form or pelletized, thereby offering various feeding options for livestock feeders. Finally, unlike the prior full-fat soybean products which have an oily texture, this product being substantially dry flows very readily and does not tend to bridge in storage tanks like the other high-fat protein materials.

Because the steamed flaked soybeans of the present invention contain greater than 17% more fat than soybean meal which has had the oils removed therefrom, the amount of energy available from the soybean is greatly enhanced. By way of comparison, one pound of soybean oil in the soybean ration will replace up to three pounds of corn for energy. By retaining the oil within the soybean feed product, the energy value of the feed is greatly enhanced.

Without further elaboration, the foregoing will so fully illustrate my invention that others may, by applying current or future knowledge, readily adopt the same for use under various conditions.

I claim:

1. A process for treating raw soybeans having the hulls intact comprising the steps of:

heating said raw soybeans with steam at a temperature of 220° F.;

increasing the surface area of said heated soybeans by flattening the soybeans while the hulls remain intact; and drying said soybeans having increased surface area at temperatures greater than 300° F. in an alternating heat cycle.

2. A process as claimed in claim 1, wherein said heating step comprises steaming said raw soybeans in a steam chamber.

3. A process as claimed in claim 2, wherein said steaming of said raw soybeans lasts for at least twenty-five minutes.

4. A process as claimed in claim 1, wherein said heating step comprises subjecting said raw soybeans to live steam for twenty to twenty-five minutes.

5. A process as claimed in claim 1, wherein said step of increasing the surface area of said soybeans comprises flaking said soybeans by passing said heated soybeans between grooved rollers in a roller mill.

6. A process as claimed in claim 5, wherein said flaked soybeans have a thickness of approximately 1/16".

7. A process as claimed in claim 1, wherein said drying step comprises subjecting said soybeans having increased surface area to alternating applications of superheated air in a dryer for twelve to fifteen minutes.

8. A process as claimed in claim 7, wherein said soybeans having increased surface area are subjected to said superheated air for alternating periods of hot air on for eight seconds, off for four seconds.

9. A process as claimed in claim 7, further comprising:

cooling said heated soybeans in said dryer; and
removing said cooled soybeans from said dryer.

10. A process as claimed in claim 9, further comprising agitating said cooled soybeans in said dryer during removal of said soybeans therefrom.

11. A process as claimed in claim 9, further comprising vibrating said dryer during removal of said cooled soybeans therefrom.

12. A process as claimed in claim 1, wherein said drying step lasts for twelve to fifteen minutes.

13. A process as cla in claim 1, further comprising holding said increased surface area soybeans in a holding tank prior to said drying step.

14. A process as claimed in claim 13, further comprising agitating said soybeans having increased surface area in said holding tank prior to said drying step.

* * * * *